(12) United States Patent
Hata et al.

(10) Patent No.: US 8,199,430 B2
(45) Date of Patent: Jun. 12, 2012

(54) TAPE DEVICE HAVING A TAPE CLEANING STRUCTURE

(75) Inventors: Yukihiro Hata, Ibaraki (JP); Shigeo Fujitani, Ibaraki (JP); Junichi Sato, Ibaraki (JP); Hisashi Takai, Ibaraki (JP); Sadamu Kuse, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 944 days.

(21) Appl. No.: 12/170,608

(22) Filed: Jul. 10, 2008

(65) Prior Publication Data

US 2009/0016186 A1 Jan. 15, 2009

(30) Foreign Application Priority Data

Jul. 13, 2007 (JP) .................................. 2007-184495
May 21, 2008 (JP) .................................. 2008-132908

(51) Int. Cl.
*G11B 23/50* (2006.01)
*B08B 5/04* (2006.01)
(52) U.S. Cl. ........................................ 360/128; 15/309.1
(58) Field of Classification Search .................. 360/128, 360/137; 15/309.1
See application file for complete search history.

(56) References Cited

U.S. PATENT DOCUMENTS

| 4,010,514 | A | * | 3/1977 | Fischer et al. | 15/309.1 |
| 4,331,993 | A | * | 5/1982 | Pfost et al. | 360/137 |
| 4,400,846 | A | * | 8/1983 | Sanderson | 15/309.1 |
| 4,412,263 | A | * | 10/1983 | Nelson et al. | 360/128 |
| 4,491,485 | A | * | 1/1985 | Sanderson | 134/9 |
| 5,045,962 | A | * | 9/1991 | Inoue et al. | 360/128 |
| 5,144,513 | A | * | 9/1992 | Gadsby et al. | 360/137 |
| 5,479,313 | A | * | 12/1995 | Haba | 360/137 |
| 6,286,170 | B2 | * | 9/2001 | Kubota et al. | 15/100 |
| 6,310,744 | B1 | * | 10/2001 | Kobayashi et al. | 360/96.1 |
| 6,700,743 | B2 | * | 3/2004 | Fahimi et al. | 360/137 |
| 7,311,234 | B2 | * | 12/2007 | Solberg | 226/97.3 |

FOREIGN PATENT DOCUMENTS

| JP | 54062811 | A | * | 5/1979 |
| JP | 2-135994 | U | | 11/1990 |
| JP | 4-3382 | A | | 1/1992 |
| JP | 04278274 | A | * | 10/1992 |
| JP | 7-78448 | A | | 3/1995 |
| JP | 9-213054 | A | | 8/1997 |
| JP | 2001-167493 | A | | 6/2001 |

OTHER PUBLICATIONS

English translation of JP H02-135994-U published Nov. 13, 1990.

* cited by examiner

*Primary Examiner* — Brian Miller
(74) *Attorney, Agent, or Firm* — Birch, Stewart, Kolasch & Birch, LLP (57) ABSTRACT

A cleaning structure for removing dust is constituted of a guiding member having a sliding surface for guiding run of a tape, and a vacuum pressure supply source for making a vacuum pressure effect on a suction space provided inside the guiding member and so on. At the sliding surface of the guiding member, a suction port for making the suction space communicate with an external space is formed, and the opening edge of the suction port on the downstream side in the tape running direction is served as a first dust removal portion for removing dust on the tape surface. The guiding member has a guiding wall having a contact surface which guides at least one tape edge of a tape, and the contact surface is served as a second dust removal portion for removing dust adhering to the tape edge.

8 Claims, 5 Drawing Sheets

TAPE DEVICE HAVING A TAPE CLEANING STRUCTURE

BACKGROUND OF THE INVENTION

1. Field of the Invention

The present invention relates to a tape device having a structure for removing dust and the like adhering to a tape surface. The tape device of the present invention means a servo writer for writing servo signals, a tape drive for reading and writing information signals.

2. Description of Related Art

Conventionally, a tape device of, for example, a servo writer has removed dust and the like adhering to a tape surface by providing a cleaning structure on the upstream side of a writing head in the tape running direction in order to avoid the dropout of a servo signal in writing the servo signals. As a cleaning structure of this kind, the type that removes dust and the like on the tape surface by wiping off with a cleaning tape (e.g., Patent Documents 1 and 2) is well known. Moreover, a cleaning structure in the other type of scraping off dust and the like on the tape surface by an edge portion of a groove formed on the peripheral surface of a round rod-shaped tape guide (e.g., Patent Document 3) is also known. Further, a cleaning structure in the other type of scraping off dust on the tape surface by a blade and removing the dust on the tape surface by suction with a vacuum pressure (e.g., Patent Documents 4 and 5) is known.

Patent Document 1: JP 2001-167493 A (paragraph 0002, FIG. 10)

Patent Document 2: JP UM H02-135994 A (page 4, lines 3 to 12, FIG. 2)

Patent Document 3: JP H09-213054 A (paragraph 0011, FIG. 1)

Patent Document 4: JP H07-78448 A (paragraph 0022, FIG. 1)

Patent Document 5: JP H04-3382 A (page 2, lines 9 to 20 in upper-right column, FIG. 3)

SUMMARY OF THE INVENTION

In recent years, tape recording media such as magnetic tapes and magnetooptical tapes have been demanded to improve the recording density of information signals to be recorded on the tape, and therefore, the width of the data track in which the information signals are recorded tends to be increasingly narrower. For example, a recording format of a recording wavelength of not greater than 0.4 µm and a data track width of not greater than 20 µm is proposed for a magnetic tape cartridge to record computer data. In this kind of magnetic tape cartridge, servo signals are written by a servo writer in manufacturing a tape to correctly trace the data track by a magnetic head, and some of the servo signals drop out if even a minute amount of dust (or particles) is adhering to the tape surface. Moreover, if even a minute amount of dust is adhering to the tape surface in reading and writing information signals on a magnetic tape cartridge, a servo signal read error occurs, failing in accurately tracing the data track and consequently leading to impaired reliability of the tape drive.

As described above, a tape device that uses a tape of a high information signal recording density as a recording medium is required to remove dust in a more advanced way. However, conventional cleaning structures cannot produce an advanced cleaning effect and have limitations. For example, the cleaning structures of the Patent Documents 1, 2, which use a cleaning tape, cannot easily obtain a sufficient cleaning effect. In addition, the tape material, or, for example, the constituent nonwoven fiber of the cleaning tape separates and adheres to the tape surface, possibly causing serious read and write errors. Moreover, since a space occupied by a set of cleaning structures is large, it is difficult to provide a plurality of cleaning structures for the tape device and to improve the dust removing effect.

In the cleaning structure of the Patent Document 3, in which the dust and the like on the tape surface are scraped off by the opening edge of the groove formed on the peripheral surface of the tape guide, the dust scraped off cannot be prevented from accumulating at the opening edge of the groove, and much time and labor are needed for removing the dust scraped off. Furthermore, it is also concerned that the dust accumulated at the opening edge might re-adhere to the tape surface.

In the above regard, the cleaning structures of the Patent Documents 4, 5, in which the dust on the tape surface is scraped off by the blade or the dust is removed by suction with a vacuum pressure, the dust can be more reliably caught and removed. However, in the cleaning structure of the Patent Documents 4, the blade is placed adjacently on the upstream side in the tape running direction of the tape guide and a suction hole is opened at the peripheral surface of the tape guide so as to communicate with a triangular space surrounded by the blade, the tape guide and the tape running surface. Therefore, it is concerned that the dust scraped off by the blade might not be sucked into the suction hole but accumulated at the leading end of the blade. Therefore, as in the cleaning structure of the Patent Document 3, the dust adhering to the leading end of the blade needs to be separately removed in the cleaning structure of the Patent Document 4.

Moreover, in the cleaning structure of the Patent Document 5, a suction hole is opened at the peripheral surface of the tape guide, and the blade is placed in a center portion in the widthwise direction of the suction hole. Therefore, much time and labor are needed for the processing and assembling of the tape guide and the blade. Since the dust is scraped off by the thin blade placed at the center in the widthwise direction of the suction hole, the blade is easily worn out, and much time and labor are needed for the maintenance. Furthermore, the conventional cleaning structures, which can remove the dust on the tape surface, are not able to remove the dust adhering to the tape edges (that is, tape side edges) that are the end portions of tape side surfaces. Therefore, it is sometimes the case where the dust that has adhered to the tape edges adheres to the tape surface, and this consequently causes the dropout of the servo signals in writing the servo signals or read error in reading the servo signals.

An object of the present invention is to provide a tape device capable of maintaining a tape in a highly clean state by reliably removing not only dust on the tape surface but also dust adhering to the tape edges. That is, the object is to provide a tape device excellent in reliability capable of reliably reading and writing servo signals and information signals by eliminating the dropout of a servo signal in writing the servo signals in a servo writer and read errors in reading the servo signals in the tape drive.

In order to achieve the above object, the present invention has the following constitutions.

According to a first aspect of the present invention, there is provided a tape device having a cleaning structure for removing dust adhering to a surface of a tape, the cleaning structure being placed on a running path of the tape, wherein the cleaning structure comprises:
 a guiding member having a sliding surface which guides run of the tape while coming in contact with the surface of the running tape; and
 a vacuum supply source for effecting a vacuum pressure on a suction space inside the guiding member, wherein
 a suction port opened to make the suction space communicate with an external space on the sliding surface of the guiding member is formed,
 the suction port which effects a suction pressure on the tape surface through the suction space and an opening edge of the suction port located on a downstream side in a tape running direction are provided as a first dust removal portion for removing dust on the tape surface, and
 a guiding wall which is fixed to the guiding member and regulates a running position of at least one tape edge of the tape while being brought in contact with the one tape edge is provided as a second dust removal portion for removing dust adhering to the tape edge.

According to a second aspect of the present invention, there is provided the tape device as defined in the first aspect, wherein the guiding wall has a contact surface which extends along the tape running direction and comes in contact with an end surface of the one tape edge of the running tape.

According to third aspect of the present invention, there is provided the tape device as defined in the first aspect, wherein the sliding surface is bordered on one side by the guiding wall.

According to a fourth aspect of the present invention, there is provided the tape device as defined in the first aspect, wherein the opening edge of the suction port located on the downstream side in the tape running direction is linearly formed perpendicular to the tape running direction.

According to a fifth aspect of the present invention, there is provided the tape device as defined in the fourth aspect, wherein the suction port is formed at a center of the sliding surface in the tape running direction.

According to a sixth aspect of the present invention, there is provided the tape device as defined in the first aspect, wherein the cleaning structure further comprises another guiding wall which is fixed to the guiding member and regulates a running position of the other tape edge of the tape while being brought in contact with the other tape edge, and
 the both guiding walls are provided as the second dust removal portion.

According to a seventh aspect of the present invention, there is provided the tape device as defined in the second aspect, wherein
 the suction port is formed extended beyond the tape edge brought in contact with the sliding surface, and
 the contact surface of the guiding wall is arranged on the downstream side than the suction port in the tape running direction, and a gap which communicates with the extended portion of the suction port is formed between the tape edge and the guiding wall on an upstream side than the suction port in the tape running direction.

According to an eighth aspect of the present invention, there is provided the tape device as defined in the first aspect, further comprising:
 an unwinding reel placed at a commencing end of the running path of the tape;
 a takeup reel placed at a terminating end of the running path of the tape;
 a first fixed guiding member which is placed on the running path of the tape and guides the run of the tape;
 a second fixed guiding member which is placed on a downstream side than the first fixed guiding member in the tape running direction on the running path of the tape and guides the run of the tape; and
 a writing head which is placed on the running path of the tape between the first and second fixed guiding members and writes servo signals on the tape, wherein
 the cleaning structure is placed on an upstream side than the first fixed guiding member in the tape running direction and on the downstream side than the second fixed guiding member in the tape running direction.

According to the present invention, in the cleaning structure for removing dust, the suction port opened to make the suction space and an external space communicate with each other is formed on the sliding surface of the guide. The suction port for effecting a suction pressure on the tape surface through the suction space and the opening edge of the suction port on the downstream side in the tape running direction are provided as the first dust removal portion where the dust on the tape surface is removed. Furthermore, the guiding wall, which is fixed to the guiding member and regulates the tape running position of the tape edge while coming in contact with at least one tape edge of the tape, is provided as the second dust removal portion that removes the dust adhering to the tape edge for the cleaning structure that removes the dust.

In the cleaning structure for removing dust having the above construction, at first, the dust adhering to the tape surface is removed by the vacuum pressure effected on the suction port in the first dust removal portion. In addition, dust remaining on the tape surface is separated from the tape surface by bringing the tape surface in contact with the opening edge of the suction port on the downstream side in the tape running direction and removed by the vacuum pressure effected on the suction port. Further, in the second dust removal portion, the dust adhering to at least one tape edge of the tape can be removed by bringing the tape edge in contact with the guiding wall. That is, the dust adhering to the tape surface is removed in the first dust removal portion, and the dust adhering to the tape edge can be removed in the second dust removal portion. Therefore, the tape can be put into a highly clean state by removing the dust from the surface and the edge of the tape that has passed through the cleaning structure in the tape running path.

As a result, read and write of the servo signals and the information signals can reliably be performed without causing the dropout of the servo signal in writing the servo signals in the tape device of, for example, a servo writer and by eliminating read errors in reading the servo signals in, for example, a tape drive. Therefore, a tape device excellent in reliability can be provided.

Moreover, the cleaning structure for removing dust as described above has a comparatively compact structure in which the suction port and the guiding wall are provided for the guiding member. Therefore, the cleaning structure can be installed in a small space, and a necessary number of the cleaning structures can be placed in necessary places. It is noted that the amount of dust removed in the second dust removal portion is very little in comparison with the amount of dust removed in the first dust removal portion. Therefore, by wipingly removing the dust adhering to the second dust removal portion after a lapse of every prescribed time or taking a similar measure, the state of the guiding member can be restored into an appropriate state.

BRIEF DESCRIPTION OF THE DRAWINGS

These aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Hereinbelow, embodiments of the invention will be described in detail with reference to the drawings.

Figure 1:
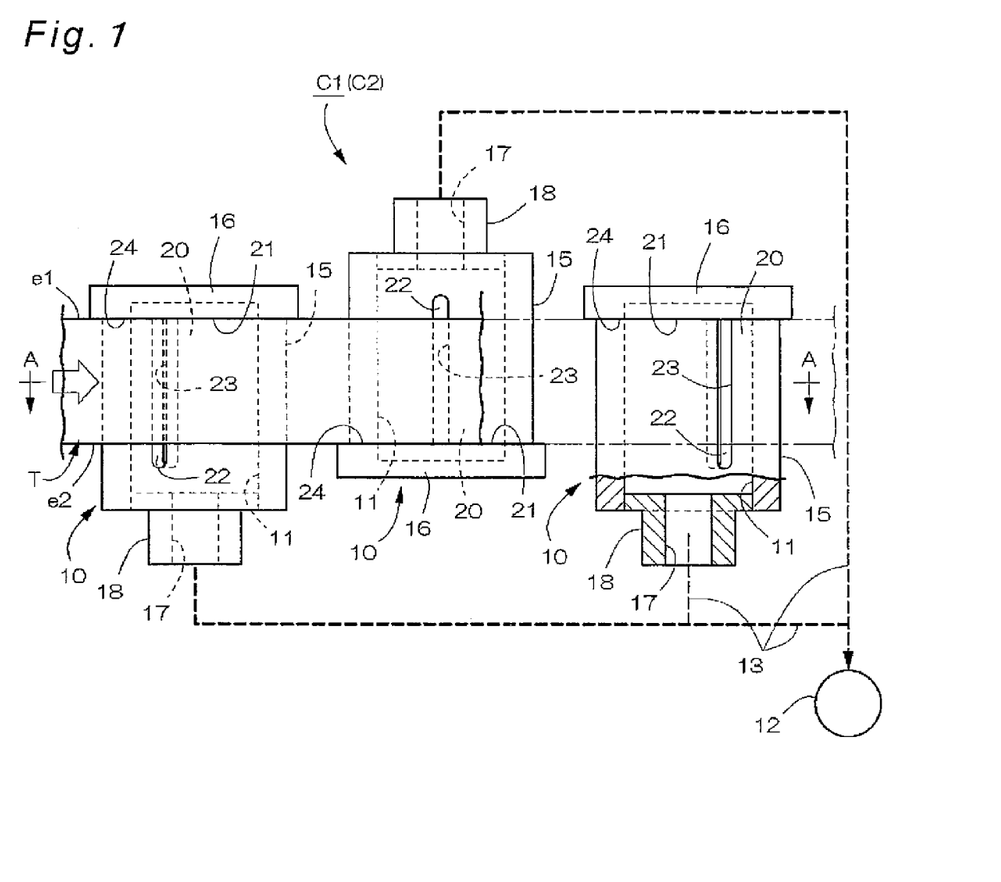
FIG. 1 is a bottom view showing the schematic construction of a cleaning unit provided for a servo writer according to one embodiment of the invention.
Figure 2A:
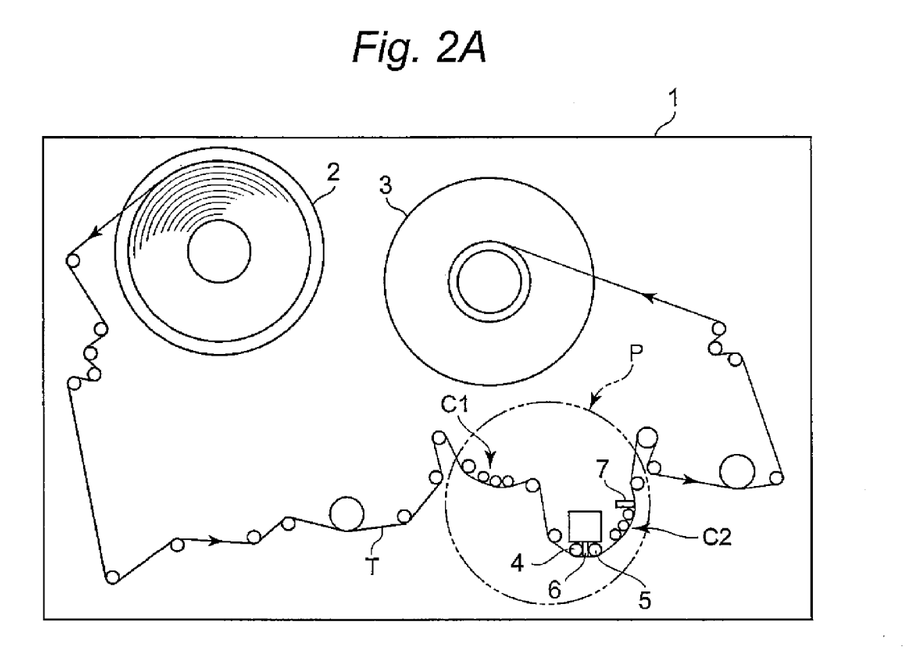
FIG. 2A is a schematic front view of the servo writer of the embodiment.
Figure 2B:
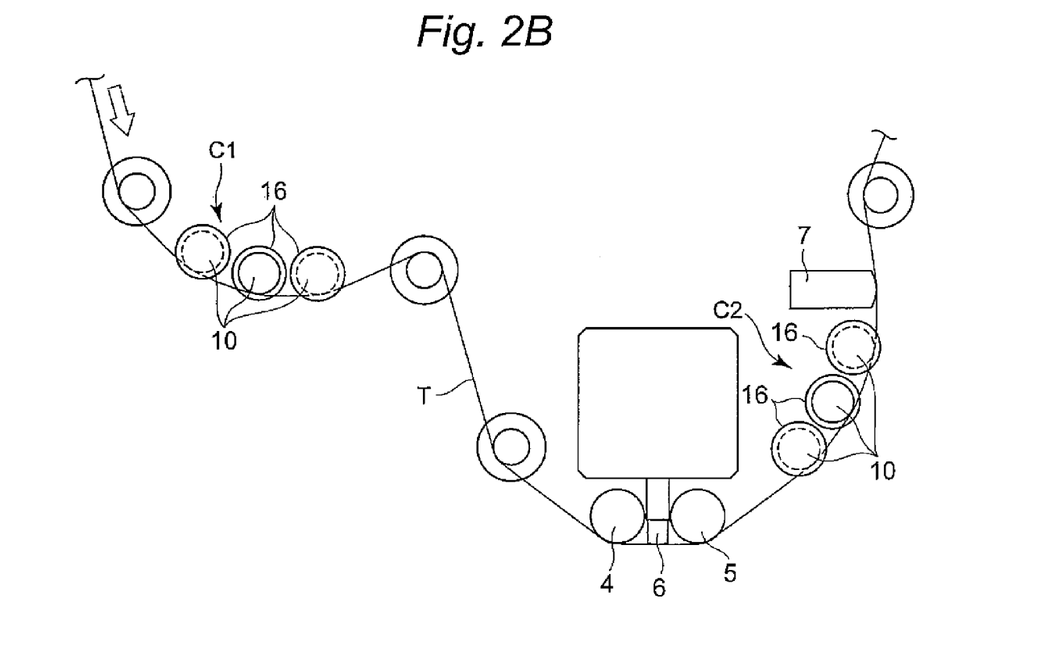
FIG. 2B is an enlarged view of a portion P in the servo writer of FIG. 2A.

FIGS. 1, 2A, 2B, 3A and 3B are views showing an embodiment in which the tape device of the present invention is applied to a servo writer. As shown in FIGS. 2A and 2B, the servo writer has an unwinding reel 2 and a takeup reel 3 on the right-hand and left-hand sides of the front surface of its machine body 1. The servo writer is constructed so that a magnetic tape (sometimes referred to simply as a "tape") T unwound from the unwinding reel 2 can be fed to the takeup reel 3 while being guided during running by a plurality of groups of tape guides. That is, the tape T runs along the plurality of tape guides arranged on the running path of the tape T with the unwinding reel 2 served as a commencing end and the takeup reel 3 served as a terminating end.

A pancake-shaped blank tape is loaded on the unwinding reel 2. In a middle portion of the tape running path of the magnetic tape T regulated by the plurality of groups of tape guides are provided a first fixed guide 4 and a second fixed guide 5 that guide the run of the magnetic tape T and a writing head 6 placed between both the fixed guides 4 and 5. As shown in FIG. 2B, the second fixed guide 5 is arranged on the downstream side than the first fixed guide 4 in the tape running direction.

An anterior cleaning unit C1 for removing dust adhering to the tape T is placed on the upstream side of the first fixed guide 4 in the tape running direction. Moreover, a posterior cleaning unit C2 for removing dust adhering to the tape T is arranged on the downstream side of the second fixed guide 5 in the tape running direction. In the present embodiment, the cleaning units C1, C2 each serve as one example of the cleaning structure for removing dust. Further, a reproducing head 7 that reads the servo signal written by the writing head 6 is placed on the downstream side of the posterior cleaning unit C2 in the tape running direction. The magnetic tape T is adjusted so that its tension becomes constant while being guided during running by a plurality of groups of tape guides.

In FIG. 1, the anterior cleaning unit C1 is constructed of three guide members 10 arranged adjacently along the tape running path, a vacuum pressure supply source 12 for effecting a vacuum pressure to suction spaces 11 each of which is formed inside each the guide members 10, communication paths 13 through which suction spaces 11 communicate with the vacuum pressure supply source 12, and so on. The guide members 10 are formed of a non-magnetic material of stainless steel, super steel, aluminum or the like excellent in abrasion resistance and integrally provided with a guide shaft portion 15 having a circular cross-section shape and a flange-shaped guiding wall 16 formed projecting at one axial end of the guide shaft 15. As shown in FIG. 1, the guide members 10 located on both the right-hand and left-hand sides in the figure among the three guide members 10 are arranged so that their guiding walls 16 are oriented to guide the running position of one tape edge e1 of the magnetic tape T while being brought in contact with the tape edge e1. In contrast to this, the guide member 10 located at the center in the figure is arranged so that its guiding wall 16 is oriented to guide the other tape edge e2 of the magnetic tape T while being brought in contact with the tape edge e2. That is, the guide members 10 placed on both the right-hand and left-hand sides in the figure and the guide member 10 placed at the center in the figure are arranged mutually inverted.

A suction space 11 is formed inside the guide shaft 15. The suction space 11 is formed concentrically with, for example, the peripheral surface of the guide shaft 15, and a fitting 18 having a passage 17 is fixed at its open end. The peripheral surface (circumferential surface) of the guide shaft 15 partially serves as a sliding surface 20 that guides the run of the magnetic tape T while being brought in contact with the surface of the tape. The peripheral surface of the guide shaft 15 including the sliding surface 20 is entirely smoothly finished by a grinding process. At the guide members 10, the guiding walls 16 are arranged adjacent to the sliding surface 20 and formed projecting from the peripheral surface of the guide shaft 15 including the sliding surface 20. The guiding wall 16 has a contact surface 21 that extends along the tape running direction and comes in contact with an end portion (or end surface) of one tape edge e1 (or e2) of the running magnetic tape T. The contact surface 21 of the guiding wall 16 is also smoothly finished by a grinding process like the sliding surface 20. The suction space 11 inside the guide shaft 15 communicates with the external space via a suction port 22 opening at the sliding surface 20.

Figure 3A:
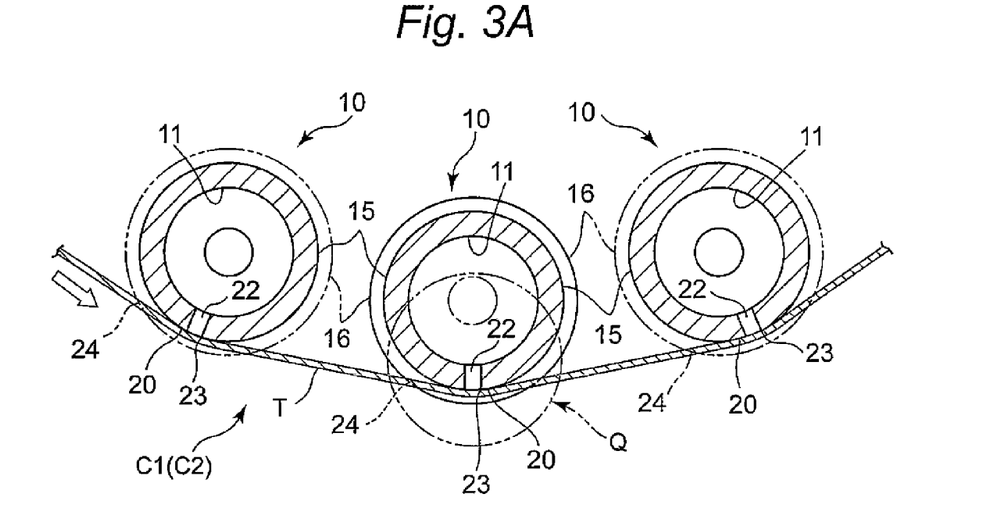
FIG. 3A is a sectional view taken along the line A-A in the cleaning unit of FIG. 1.
Figure 3B:
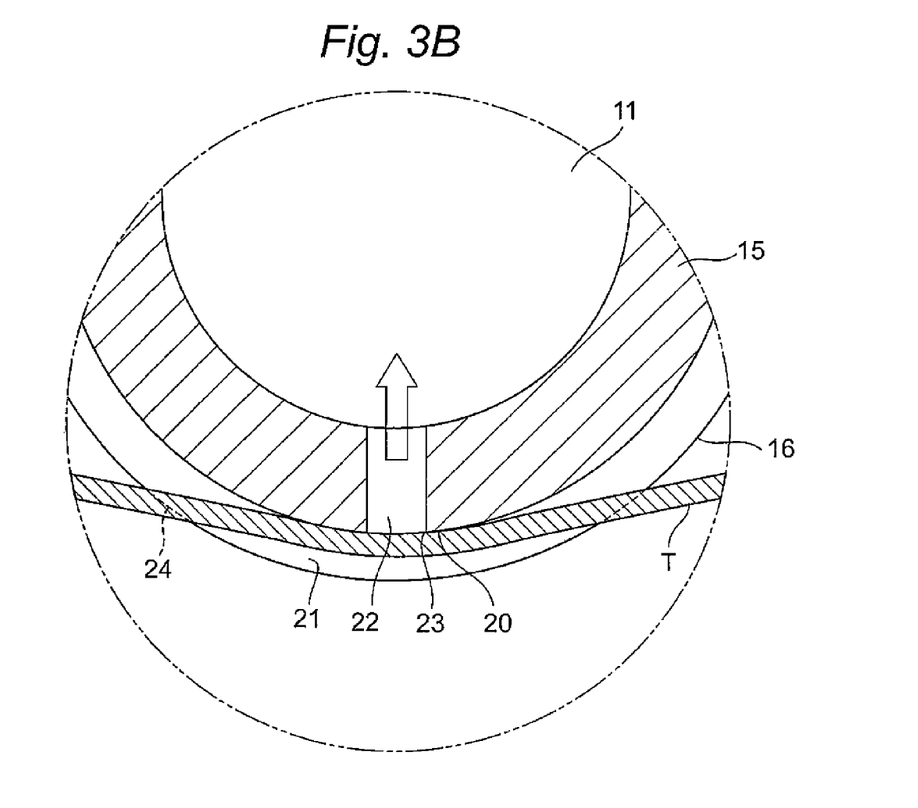
FIG. 3B is an enlarged view of a portion Q in the cleaning unit of FIG. 3A.

As shown in FIG. 1, the suction port 22 is formed in, for example, a slit-like shape having a specified opening width, arranged in a center portion in the tape running direction at the sliding surface 20 and formed opening at the peripheral surface of the guide shaft portion 15 in a state in which the lengthwise direction of the suction port 22 is perpendicular to the tape running direction. Moreover, an opening edge of the suction port 22 on the downstream side in the tape running direction serves as a first edge portion 23. As shown in FIGS. 3A and 3B, the magnetic tape T is guided during running while being brought in contact with the sliding surface 20 including the suction port 22 in a wrapped state. While the magnetic tape T traverses along the suction port 22 in the tape running direction, dust adhering to the tape surface is removed by suction with a vacuum pressure effecting on the suction space 11. Further, dust remaining unremoved adhering to the tape surface without being sucked can be scraped off by the first edge portion 23 of the suction port 22 and removed by suction with the vacuum pressure. In the present embodiment, the suction port 22 that removes the dust adhering to the tape surface through the suction operation and the first edge portion 23 that performs the removal operation by physical contact serve as one example of a first dust removal portion (or a first dust removal structure). It is noted that the first edge portion 23 is linearly formed and arranged perpendicular to the tape running direction.

As shown in FIG. 1, the magnetic tape T wrapped round the sliding surface 20 of the guide member 10 is guided during running in a state in which the one tape edge e1 (or e2) is brought in contact with the contact surface 21 of the guiding wall 16 and the running position of the tape edge e1 (or e2) is regulated. In this state, dust adhering to the tape edge e1 (or e2) is scraped off by a second edge portion 24 which is a peripheral portion of the contact surface 21 that intersects the tape edge e1 (or e2) on the upstream side in the tape running direction. In addition, dust adhering to the tape edge e1 (or e2) is scraped off by the contact of the tape edge e1 (or e2) with the contact surface 21. That is, the contact surface 21 of the guiding wall 16 including the second edge portion 24 of the fore peripheral portion functions as a second dust removal portion (or a second dust removal structure) that removes the dust adhering to the tape edge (see FIGS. 3A and 3B).

A diametric dimension D of the guide shaft 15 that constitutes the guide member 10, a lengthwise dimension L and a widthwise dimension B of the suction port 22, and a suction air quantity Q at each individual guide member 10 can be arbitrarily selected according to the thickness of the magnetic tape T, Young's modulus, the physical characteristics of the magnetic layer and the tape travel speed and so on. Generally with setting as follows, a suitable cleaning effect can be produced.

Diametric dimension D of guide shaft 15=15 to 30 mm

Lengthwise dimension L of suction port 22=Widthwise dimension of magnetic tape T+(0.5 to 5 mm)

Widthwise dimension B of suction port 22=0.5 to 5 mm

Suction air quantity Q at individual guide member 10=2 to 15 l (liter)/min

Since the posterior cleaning unit C2 has substantially the same structure as that of the anterior cleaning unit C1, same components are denoted by same reference numerals, and no description is provided therefor.

According to the servo writer constructed as above, the dust adhering to the tape surface can be removed by suction from the suction port 22 with a vacuum pressure that takes effect on the suction space 11. Furthermore, the dust remaining unremoved adhering to the tape surface without being sucked can be scraped off by the first edge portion 23, and the dust scraped off can be removed by suction into the suction space 11. In addition, the dust adhering to the tape edge e1 (or e2) can be scraped off by the second edge portion 24, and the dust residually adhering to the tape edge e1 (or e2) can be removed by bringing the tape edge e1 (or e2) in contact with the contact surface 21 of the guiding wall 16. Therefore, the magnetic tape T can be maintained in a highly clean state in the servo writer. The amount of dust scraped off by the second edge portion 24 and the amount of dust removed by the contact surface 21 of the guiding wall 16 are very little compared to the amount of dust scraped off from the tape surface. Therefore, by wipingly removing the dust adhering to the contact surface 21 including the second edge portion 24 every time the servo signal is written into one pancake-shaped blank tape in the servo writer, the contact surface 21 including the second edge portion 24 can be restored into the clean state and made ready for the next signal writing. The reason why the cleaning unit C2 is placed in the neighborhood of the reproducing head 7 on the upstream side in the tape running direction is to maintain the tape surface that has passed along the writing head 6 again in a clean state, to accurately detect writing errors of the servo signal by the reproducing head 7 and to maintain the magnetic tape T to be taken up around the takeup reel 3 in a clean state. Further, the cleaning units C1, C2 can remove dust by the guide members 10 arranged on the tape running path, and therefore, the installation space is allowed to be small. Therefore, the arrangement is advantageous in the point that a necessary number of guide members 10 can be arranged in necessary places in the tape conveyance path and the tape T can be highly cleaned.

Figure 4:
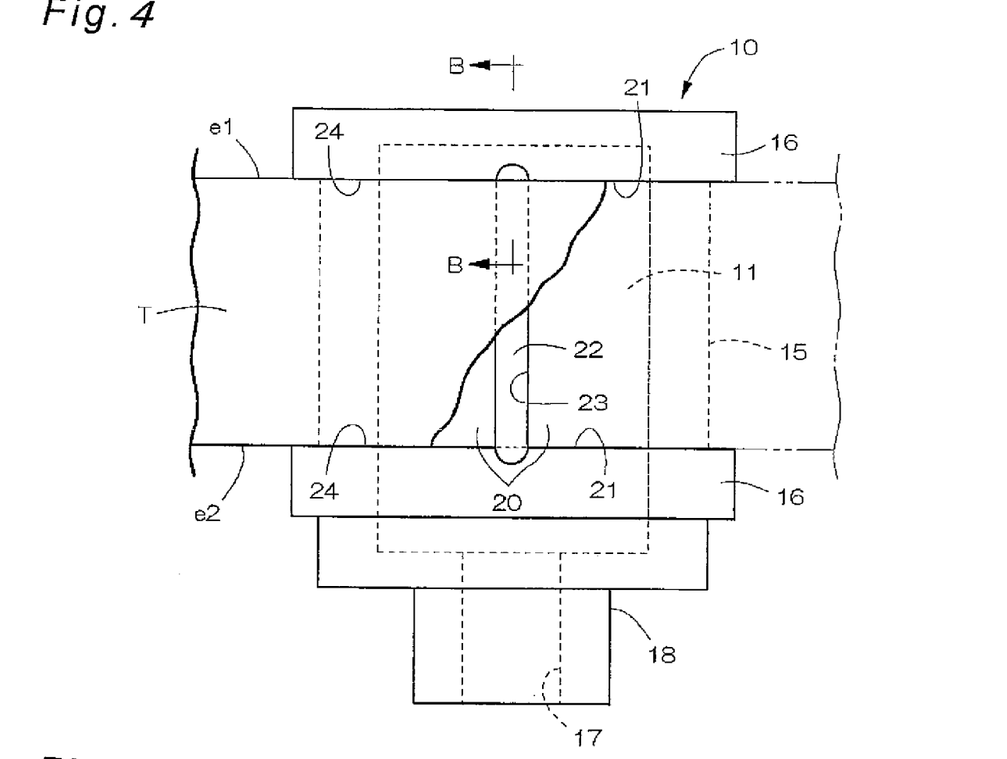
FIG. 4 is a bottom view showing a guiding member provided for a cleaning unit of another embodiment.
Figure 5:
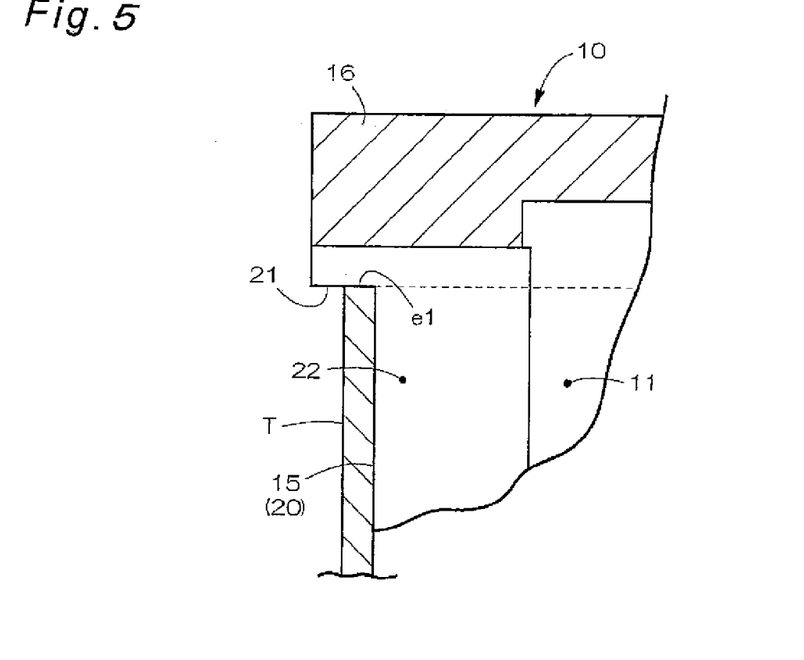
FIG. 5 is a sectional view taken along the line B-B in the guiding member of FIG. 4.

The construction of a cleaning unit according to another embodiment of the invention is described next. FIGS. 4 and 5 show another embodiment of the guide member 10. As shown in FIGS. 4 and 5, the distinct embodiment has a construction differing from that of the cleaning unit shown in FIG. 1 in the point that the guiding wall 16 is provided at both ends of the guide shaft 15. By thus adopting the construction in which the guiding wall 16 is provided at both ends of the guide shaft 15, dust adhering to the tape edges e1 and e2 at both ends in the widthwise direction of the magnetic tape T can be concurrently removed by the contact surfaces 21 of the guiding walls 16 including the second edge portions 24. Moreover, the suction port 22 is formed so as to extend beyond the tape edges e1 and e2.

According to the cleaning unit constructed as above, the number of guide members 10 to be placed can be reduced in comparison with the case where the guiding wall 16 is provided on only one side of the guide member 10, and the cost of the cleaning unit placed in the tape device can be reduced by that much.

Figure 6:
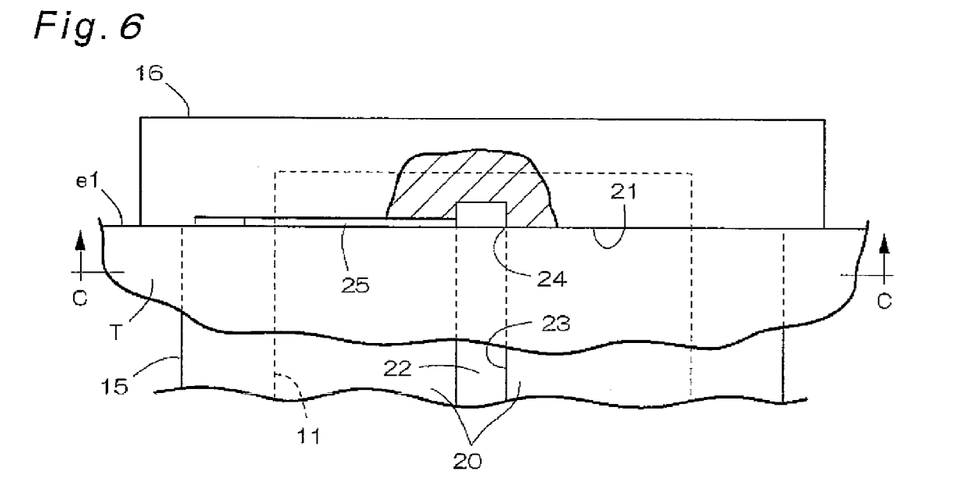
FIG. 6 is a bottom view showing a guiding member provided for a yet another cleaning unit.
Figure 7:
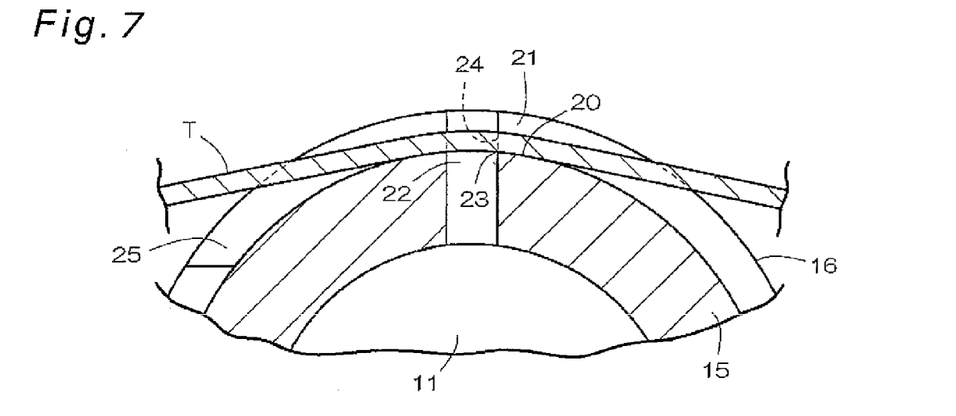
FIG. 7 is a sectional view taken along the line C-C in the guiding member of FIG. 6.

The construction of a cleaning unit according to a yet another embodiment of the invention is described next. FIGS. 6 and 7 show a yet another embodiment of the guide member 10. As shown in FIGS. 6 and 7, in the distinct embodiment, an end portion of the suction port 22 is formed extended beyond the tape edge e1 (or e2), i.e., extended beyond the end portion of the sliding surface 20. Further, an escape recess portion 25 is formed at the guiding wall 16 on the upstream side than the suction port 22 in the tape running direction. In concrete, the escape recess portion 25 is formed at the guiding wall 16 in a manner that the contact surface 21 of the guiding wall 16 is arranged on the downstream side than the suction port 22 in the tape running direction, and a gap is formed between the tape edge e1 (or e2) and the guiding wall 16 on the upstream side than the suction port 22 in the tape running direction. Further, the gap of the escape recess portion 25 communicates with the extended portion of the suction port 22, allowing the gap to produce a suction effect between the guiding wall 16 and the tape edge e1 (e2). Moreover, due to the arrangement that contact surface 21 of the guiding wall 16 is positioned on the downstream side than the suction port 22 in the tape running direction, the second edge portion 24 of the contact surface 21 is arranged in contact with the suction port 22.

In the cleaning unit constructed as above, the dust scraped off by the second edge portion 24 can be removed by suction into the suction space 11 via the suction port 22. Therefore, the dust scraped off can be prevented from accumulating at the second edge portion 24. Further, a vacuum pressure can be effected on the tape edge e1 (or e2) in the gap between the guiding wall 16 and the tape edge e1 (or e2) formed on the upstream side than the suction port 22 in the tape running direction, and dust adhering to the tape edge e1 (or e2) can be removed by suction into the suction space 11 via the suction port 22. Although the second edge portion 24 is provided on the extension of the first edge portion 23 in the embodiment, it is not always necessary to adopt such a construction. It is only necessary to form the second edge portion 24 in the position facing the suction port 22, so that the second edge portion 24 can be formed in, for example, the center portion in the widthwise direction of the suction port 22.

The guide members 10 of the above embodiments should preferably be formed of ceramics of, for example, alumina, zirconia or ALTiC excellent in abrasion resistance. If the guide members 10 are thus formed of ceramics excellent in abrasion resistance, the contact surface 21 of the guiding wall 16 can be satisfactorily prevented from being abraded by the tape edges e1 and e2 that are running at high speed. Moreover, since a suitable surface roughness is obtained, the tape T can be prevented from suffering damages.

The above embodiments have been described taking the case where the first dust removal portion and the second dust removal portion provided for the cleaning units C1, C2 are constituted by utilizing the edge structure or the combination of the edge structure and the surface wall as an example, the invention is not limited only to this case. That is, the invention is not limited only to the combination of the dust removal by the contact of the tape with the edge structure or the dust removal by the contact (surface contact) of the tape and the surface structure (contact surface or the like). It may be a case where the dust removal by the surface contact of the tape with the surface structure is performed by the dust removal portion without using the edge structure instead of the above case. In particular, the dust adhering to the tape edge e1 (or e2) can be removed by receiving the tape edge e1 (or e2) by the contact surface 21 of the guiding wall 16. Therefore, the second dust removal portion may have a concept that includes either one or both of edge structure and the surface wall structure. For example, even when the second edge portion 24 of the guiding wall 16 is processed to be radiused and no edge structure exists in the second dust removal portion, the dust adhering to the tape edge e1 (or e2) can be removed by the contact of the tape edge e1 (or e2) with the contact surface 21. When the structure of subjecting the second edge portion to the radiusing process is adopted, it is possible to, for example, prevent the magnetic tape T of a weak strength from being damaged by the contact with the second edge portion.

The cleaning structure for removing the dust of the invention can be applied to a tape drive that reads and writes the information signals on the tape T as one example of the tape device besides the above embodiments. Moreover, only the tape surface (signal writing surface) on which the signals are written by the writing head 6 and the tape edge e1 (or e2) are cleaned by the cleaning structures C1, C2 in the above embodiments. However, the tape surface (non-signal writing surface) opposite from the signal writing surface can be cleaned by a separately provided cleaning structure for removing dust as occasion demands. Moreover, the tape surface on the non-signal writing surface side can be cleaned by the guide member 10 placed at the center in the cleaning structure C1 described with reference to FIG. 1.

Although the case where the sliding surface 20 is arranged in a part of the circumferential surface of the guide shaft 15 that has a circular cross-section shape has been described in the above embodiments, the invention is not limited only to such a case. The "sliding surface" may be constructed of a curved surface like a circumferential surface or constructed of a flat surface. Therefore, the cross-section shape of the guide shaft 15 needs not be circular but allowed to be formed in an arbitrary cross-section shape. However, the sliding surface 20 is preferably a part of the circumferential surface from the viewpoint of improving the contact of the magnetic tape T with the sliding surface 20.

The case where the suction port 22 is formed at the center of the sliding surface 20 in the tape running direction has been described in the above embodiments. However, it is only required that at least part of the suction port is formed within the sliding surface 20, and it is more preferable that whole of the suction port is formed within the sliding surface 20 in the tape running direction. That is, it is more preferable that the sliding surface 20 exists on the upstream side and the downstream side in the tape running direction of the suction port 22.

Moreover, there may be a case where a plurality of suction ports are formed at the sliding surface 20 unlimitedly to the case where only one suction port 22 is formed. On the sliding surface 20, it is required that one or a plurality of suction ports are only required to extend substantially throughout the entire widthwise direction of the magnetic tape T.

Moreover, it may be a case where the first edge portion 23 is formed obliquely intersecting the tape running direction in the suction port 22 instead of the case where the linearly formed first edge portion 23 is arranged perpendicular to the tape running direction. In the construction in which the first edge portion 23 is arranged perpendicular to the tape running direction, the required length in the tape running direction of the sliding surface 20 can be minimized in comparison with the construction in which, for example, the first edge portion 23 obliquely intersects the tape running direction, and the time and labor of maintenance for, for example, regrinding the sliding surface 20 and maintaining the sliding surface 20 and the first edge portion 23 in appropriate conditions can be reduced.

Further, the suction port 22 does not need to be formed along the radial direction line of the guide shaft but allowed to be formed inclined to the radial direction line to reduce the edge angle of the first edge portion 23. Moreover, it may be a case where the center of the suction space 11 is formed eccentric to the center of the guide shaft 15, and the suction port 22 is formed at the intersection between the suction space 11 and the sliding surface 20. The guide shaft 15 and the guiding wall 16 are not limited only to the case where they are integrally formed but allowed to be formed of independent components. Moreover, the guiding wall 16 is not limited to the case where it is formed in contact with the sliding surface 20, that is it is formed so that the sliding surface 20 is bordered on its one side by the guiding wall 16. It may be a case where the guiding wall 16 is formed in a position located apart from the sliding surface 20. It is noted that the movement of the magnetic tape T is suppressed in the widthwise direction when brought in contact with the sliding surface 20. Therefore, a construction in which the contact surface 21 is arranged in contact with the sliding surface 20 is preferable from the viewpoint of establishing a stable contact of the tape edge e1 (or e2) with the contact surface 21 of the guiding wall 16. It is noted that the guiding wall 16 is not necessarily be formed into a flange-like shape but only required to have a shape such that a contact of the tape edge e1 (or e2) with the contact surface 21 can be established. The guiding wall can also be formed in a variety of other shapes.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-184495 filed on Jul. 13, 2007 and the entire disclosure of Japanese Patent Application No. 2008-132908 filed on May 21, 2008, including the specifications, drawings and claims thereof, are incorporated herein by reference in their entireties.

What is claimed is:

1. A tape device having a cleaning structure for removing dust adhering to a surface of a tape, the cleaning structure being placed on a running path of the tape, wherein the cleaning structure comprises:
   a guiding member having a sliding surface which guides the surface of the running tape while coming in contact with the surface of the running tape; and
   a vacuum supply source for effecting a vacuum pressure on a suction space inside the guiding member, wherein the guiding member includes:
   a suction port opened to make the suction space communicate with an external space on the sliding surface of the guiding member, and
   a guiding wall fixed to the guiding member, the guiding wall coming in contact with only one of the tape edges of the running tape, wherein the suction port which effects a suction pressure on the tape surface through the suction space and an opening edge of the suction port located on a downstream side in a tape running direction are provided as a first dust removal portion for removing dust on the tape surface, and the guiding wall which regulates a running position of the only one of the tape edges of the running tape while being brought in contact with the only one of the tape edges, is provided as a second dust removal portion for removing dust adhering to the tape edge.

2. The tape device as defined in claim 1, wherein the guiding wall has a contact surface which extends along the tape running direction and comes in contact with an end surface of the only one of the tape edges of the running tape.

3. The tape device as defined in claim 2, wherein
   the suction port is formed extended beyond the tape edge brought in contact with the sliding surface, and
   the contact surface of the guiding wall is arranged on the downstream side of the suction port in the tape running direction, and a gap which communicates with the extended portion of the suction port is formed between the tape edge and the guiding wall on an upstream side of the suction port in the tape running direction.

4. The tape device as defined in claim 1, wherein the sliding surface is bordered on one side by the guiding wall.

5. The tape device as defined in claim 1, wherein the opening edge of the suction port located on the downstream side in the tape running direction is linearly formed perpendicular to the tape running direction.

6. The tape device as defined in claim 5, wherein the suction port is formed at a center of the sliding surface in the tape running direction.

7. The tape device as defined in claim 1, further comprising:
   an unwinding reel placed at a commencing end of the running path of the tape;
   a takeup reel placed at a terminating end of the running path of the tape;
   a first fixed guiding member which is placed on the running path of the tape and guides the surface of the running tape;
   a second fixed guiding member which is placed on a downstream side of the first fixed guiding member in the tape running direction on the running path of the tape and guides the surface of the running tape; and
   a writing head which is placed on the running path of the tape between the first and second fixed guiding members and writes servo signals on the tape, wherein
   the cleaning structure is placed on an upstream side of the first fixed guiding member in the tape running direction and on the downstream side of the second fixed guiding member in the tape running direction.

8. The tape device as defined in claim 1, wherein the cleaning structure comprises first and second guiding members each of which has the sliding surface and the guiding wall, and which are placed along the running path of the tape, and
   the guiding wall of the first guiding member comes in contact with only one tape edge and the guiding wall of the second guiding member comes in contact with only the other tape edge.

* * * * *